June 19, 1945.  G. J. ABBOTT  2,378,375

TRANSMISSION MECHANISM OF THE V-PULLEY TYPE

Filed July 24, 1944

Inventor
G. J. Abbott
By
Emery Holcombe
Attorneys

Patented June 19, 1945

2,378,375

UNITED STATES PATENT OFFICE 2,378,375

TRANSMISSION MECHANISM OF THE
V-PULLEY TYPE

Geoffrey Joseph Abbott, Carshalton, England, assignor to P. I. V. Chain Gears Limited, London E. C. 2, England, a company of Great Britain Application July 24, 1944, Serial No. 546,402
In Great Britain April 19, 1944

12 Claims. (Cl. 74—230.17)

The present invention relates to variable ratio transmission mechanism of the type comprising V-pulleys having flanges movable towards and away from each other, and means for varying the spacing between the flanges of the two pulleys oppositely to vary the transmission ratio, and also for forcing the flanges of at least one pulley together with a force depending on the torque being transmitted so as to prevent slipping of the belt, chain or like transmission member connecting them.

The object of the invention is to provide improved means for forcing the flanges together to grip the belt or the like.

According to the present invention at least one pulley flange is connected to the member which it drives or is driven by through one or more rocking eccentric sectors pivoted on one member and rolling against the other so that as the flange turns relatively to the said member the sector rolls round and forces the flange axially towards the companion flange. The eccentric sector may be keyed to the surface on which it rolls by a projection on one surface entering a recess in the other to prevent relative slipping between the rolling surfaces.

Preferably the mechanism includes one or more springs urging the pulley flanges towards one another to maintain the tension when the torque is relieved. The member against which each spring bears may be moved with the corresponding flange when the ratio is altered so that the spring deflection and chain tension can remain substantially constant as the ratio is altered.

Figure 1:
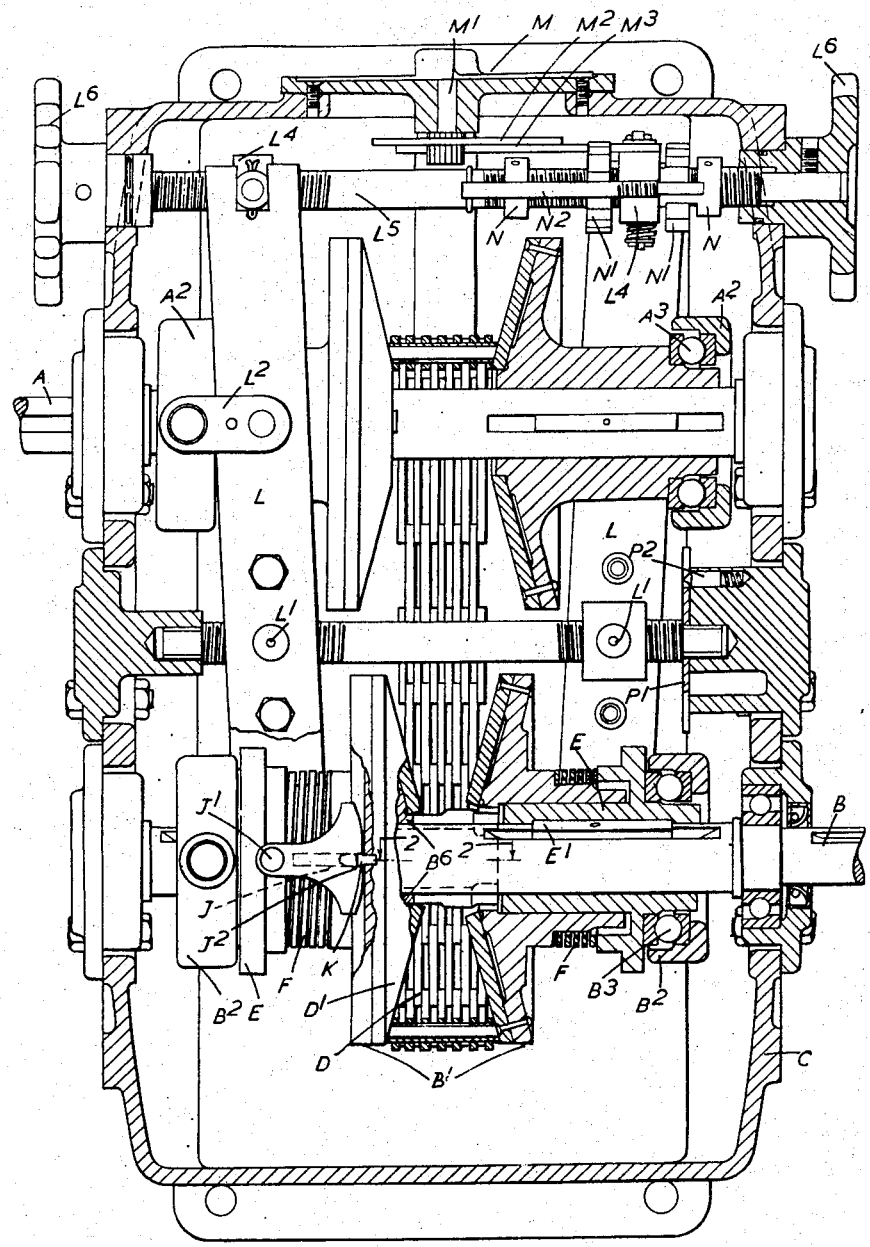
Figure 2:
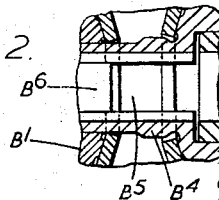

The invention may be carried into practice in various ways but one construction according to the invention as applied to a variable ratio transmission mechanism of the kind forming the subject of United States of America Patent No. 1,601,662 is illustrated by way of example in the accompanying drawing in which Figure 1 is a plan showing one form of variable ratio transmission mechanism according to the invention, and Figure 2 is a section on the line 2—2 of Figure 1.

The variable speed gear shown comprises a driving shaft A and a driven shaft B supported parallel to one another in bearings in a casing C. Carried by the driving and driven shafts are V-pulleys the flanges of which are designated by the reference letters $A^1$ and $B^1$ respectively and are each provided with a series of radial depressions separated by radial ribs or projections, as shown, the arrangement being such that each projection on one flange of a pulley lies opposite to a correspondingly dimensioned depression in the other flange of the pulley, as described, for example, in the specification of United States of America Patent No. 1,601,662. The flanges $A^1$, $A^1$ of the pulley on the driving shaft A are mounted, for example, on splines on the shaft A so as to be movable axially along the shaft but not rotatable relatively thereto and surrounding the driving shaft A are two thrust collars $A^2$ which can act through thrust bearings indicated at $A^3$ on the flanges to cause axial movement thereof along the shaft A in a manner generally known.

The pulleys are connected by a transmission member D which lies between the pulley flanges and is in the form of a chain comprising a support carrying a series of slat-like members indicated at $D^1$ adapted to move upon the support in a direction transverse to the length of the chain to form what may be termed compound teeth of variable pitch, the number of elements in each tooth being capable of variation to suit the dimensions of the recesses in the pulley flanges whatever portion of the pulley flanges is engaged by the chain, this chain being formed, for example, as described in the specification of the present applicant's United States of America Patent No. 1,601,663.

The pulley constituted by the flanges $B^1$ has associated with it mechanism according to the present invention. Thus instead of being directly keyed to the shaft, the pulley flange is free to slide and to turn relatively to the shaft and also to a sleeve E which latter is splined or keyed to the shaft as shown at $E^1$ so as to be free to move axially along but not rotate relatively to the shaft. A pair of thrust collars $B^2$ act through thrust bearings $B^3$ on the sleeves E to move the latter along the shaft B to adjust the ratio.

In order to prevent relative angular movement between the two flanges while permitting relative axial movement one of the flanges is formed with a sleeve $B^4$ which has in it a longitudinal slot $B^5$. This sleeve extends into the companion flange and the latter has a pair of inwardly projecting teeth $B^6$ which enter the slot and prevent relative rotation.

Interposed between a face of each sleeve and an opposed face of the corresponding flange is a helical compression spring F. These springs tend to urge the flanges towards one another.

Also interposed between each sleeve and the corresponding flange are a pair of eccentric sector plates J. Each of these is pivoted to the sleeve at $J^1$ and its curved surface rolls in contact with the outer face of the adjacent flange. The curved face may conveniently be made up of two circular arcs struck about different centres so that as the sector rolls in either direction from its central position it forces the flange away from the sleeve and hence towards the companion flange. Each of these curved faces approximates to a logarithmic spiral so that the inclination between the axis of the shaft and the line joining the centre of the sector to its point of contact with the flange, remains approximately constant. Hence the ratio between the torque transmitted and the force urging the flanges together does not alter appreciably as the sector rolls round. Each sector has in its rolling face a recess $J^2$ into which projects a pin K carried by the flange. This is shaped and functions like a gear tooth serving to prevent relative slip between the sector plate and the flange.

Means are provided for moving the pulley flanges $A^1$ and $B^1$ towards and away from one another in such a manner that as the flanges $B^1$ approach one another the flanges $A^1$ are moved apart, and vice versa, for the purpose of varying the transmission ratio as between the pulleys constituted by the flanges $A^1$ and $B^1$. To this end two levers L are mounted to rock about pivots $L^1$ within the casing C, each of these levers carrying adjacent to one of its ends a link (not shown) which connects it to the adjacent thrust collar $B^2$ while it carries adjacent to its other end a link $L^2$ which connects it to the adjacent thrust collar $A^2$. The levers L carry at their upper ends in Figure 1 bars $L^4$ having in them screwthreaded holes which engage respectively left- and right-handed screwthreads on a rotatable shaft $L^5$ adapted to be rotated by handles $L^6$.

It will thus be seen that by rotating the handle $L^6$ the levers L can be rocked about the pivots $L^1$ to cause the thrust members $B^2$ to move towards one another as the thrust members $A^2$ are permitted to move apart, and vice versa, these thrust members acting through the appropriate thrust bearings on the flanges $B^1$ and $A^1$ to cause corresponding movement of these flanges.

Whatever the relative positions of the flanges $B^1$, however, it will be seen that power is transmitted from these flanges to the shaft B through the sector plates J and that the eccentric rolling action of the latter due to the transmission of power will tend to force the pulley flanges $B^1$ towards one another to grip the transmission member D. The formation of the curved surface of the sector plates J is such that, whatever the power being transmitted, the force with which they tend to move the flanges $B^1$ towards one another is sufficient to maintain substantially the correct tension in the chain and it will be seen that this force will vary with the power being transmitted so that substantially the correct tension in the chain can be maintained under all working conditions. The springs F on the other hand serve to cause the flanges $B^1$ to exert the required wedging action and thus maintain the chain at the correct tension during periods when little or no power is being transmitted and during the periods when, due to reversal of torque, the pressure due to the sector plates J might instantaneously be inoperative to maintain this wedging action.

One of the bars $L^4$ is provided with means for indicating the position of adjustment of the gear comprising a pointer M mounted on a shaft $M^1$ to move over a suitable scale on the outside of the casing. An arm $M^2$ on the inner end of the shaft $M^1$ is connected by a link $M^3$ to the bar $L^4$.

Means is also provided at the same point for limiting the range of adjustment as may be desired. The shaft $L^5$ carries two fixed collars N and two movable nuts $N^1$ having a number of radial projections. A rod $N^2$ screwed through the bar $L^4$ passes between these projections and prevents these nuts from rotating so that as the shaft is rotated the nuts are screwed along with the bar $L^4$ till one of them abuts against the corresponding collar N and prevents further movement. By removing the rod $N^2$ the nuts $N^1$ can be adjusted so as to alter the extent of movement of the gear permitted in either direction.

Conveniently the pivots $L^1$ carrying the levers L are also adjustable for example by means of left- and right-hand screwthreads on a shaft P provided with a plate $P^1$ and spring plunger catch $P^2$. Rotation of this shaft moves the one pair of flanges $B^1$ towards or away from each other without moving the other pair of flanges $A^1$ oppositely, and hence effects an adjustment to the tension of the chain.

Moreover due to the arrangement of the springs F this adjustment is not upset by rotation of the handles $L^6$ to change the transmission ratio, since the sleeves E move together or apart at the same time as the flanges and hence the compression of the springs F need not vary. If however, a greater tension and contact pressure are required to transmit increased power these are provided by the rolling sector plates J.

What I claim as my invention and desire to secure by Letters Patent is:

1. Variable-ratio transmission mechanism including a belt-like transmission member, pulleys whereof the distances between the flanges are oppositely variable to vary the transmission ratio, drive members respectively driving one pulley and driven by the other, and means for forcing the flanges on at least one pulley together with a force depending on the transmitted torque to prevent slip, comprising a connection between one pulley flange and the associated drive member including at least one rocking eccentric sector pivoted on one of the said parts and rolling against the other so that as the flange turns relatively to the drive member the sector rolls round and forces the flange axially towards the companion flange.

2. Transmission mechanism as claimed in claim 1 in which the eccentric sector is keyed to the surface on which it rolls by a projection on one surface entering a recess in the other to prevent relative slipping between the rolling surfaces.

3. Transmission mechanism as claimed in claim 1 including at least one spring urging the pulley flanges towards one another to maintain the tension when the torque is relieved.

4. Transmission mechanism as claimed in claim 1 including at least one spring bearing against a member which moves with the corresponding flange when the ratio is altered, to maintain the tension when the torque is relieved regardless of changes of ratio.

5. Transmission mechanism as claimed in claim 1 having, for adjusting the transmission ratio, a pair of levers connected to the flanges at points on opposite sides of their fulcrums, and means for adjusting their fulcrums towards and away from each other to adjust the driving pressure and chain tension.

6. Transmission mechanism as claimed in claim 1 having a casing and indicating means for indicating outside the casing the ratio to which the mechanism is set.

7. In variable ratio transmission mechanism including V-pulleys the opposed flange faces of each of which are formed with radial ribs and grooves each rib of one flange being opposite a correspondingly dimensioned groove of the companion flange and a belt-like transmission member extending between the pulleys in the form of a chain comprising a support carrying a series of slat-like elements movable transversely to the chain to form compound teeth of variable pitch engaging the ribs and grooves, the distances between the pulley flanges being oppositely variable to vary the transmission ratio, drive members respectively driving one pulley and driven by the other, and means for forcing the flanges on at least one pulley together with a force depending on the transmitted torque to prevent slip, comprising a connection between one pulley flange and the associated drive member including at least one rocking eccentric sector pivoted on one of the said parts and rolling against the other so that as the flange turns relatively to the drive member the sector rolls round and forces the flange axially towards the companion flange.

8. Transmission mechanism as claimed in claim 7 in which the eccentric sector is keyed to the surface on which it rolls by a projection on one surface entering a recess in the other to prevent relative slipping between the rolling surfaces.

9. Transmission mechanism as claimed in claim 7 including at least one spring urging the pulley flanges towards one another to maintain the tension when the torque is relieved.

10. Transmission mechanism as claimed in claim 7 including at least one spring bearing against a member which moves with the corresponding flange when the ratio is altered, to maintain the tension when the torque is relieved regardless of changes of ratio.

11. Transmission mechanism as claimed in claim 7 having, for adjusting the transmission ratio, a pair of levers connected to the flanges at points on opposite sides of their fulcrums, and means for adjusting their fulcrums towards and away from each other to adjust the driving pressure and chain tension.

12. Transmission mechanism as claimed in claim 7 having a casing and indicating means for indicating outside the casing the ratio to which the mechanism is set.

GEOFFREY JOSEPH ABBOTT.